(12) United States Patent
Oshman

(10) Patent No.: US 11,142,133 B1
(45) Date of Patent: Oct. 12, 2021

(54) BIKE RACKS INCLUDING ADJUSTABLE HOOKS

(71) Applicant: Joseph Oshman, Portland, OR (US)

(72) Inventor: Joseph Oshman, Portland, OR (US)

( * ) Notice: Subject to any disclaimer, the term of this patent is extended or adjusted under 35 U.S.C. 154(b) by 0 days.

(21) Appl. No.: 17/240,099

(22) Filed: Apr. 26, 2021

Related U.S. Application Data

(60) Provisional application No. 63/114,263, filed on Nov. 16, 2020.

(51) Int. Cl.
    *B60R 9/10* (2006.01)
    *B62H 3/02* (2006.01)
    *B62H 3/12* (2006.01)
    *B60R 9/06* (2006.01)

(52) U.S. Cl.
    CPC .............. *B60R 9/10* (2013.01); *B60R 9/06* (2013.01); *B62H 3/02* (2013.01); *B62H 3/12* (2013.01)

(58) Field of Classification Search
    CPC ......... Y10S 224/924; B60R 9/06; B60R 9/10; B62H 3/02; B62H 3/10; B62H 3/12; B62H 3/00; B62H 3/08
    See application file for complete search history.

(56) References Cited

U.S. PATENT DOCUMENTS

| | | | | |
|---|---|---|---|---|
| 624,231 A | * | 5/1899 | Martin | B62H 3/12 211/17 |
| 1,975,303 A | * | 10/1934 | Walker | G10G 5/00 248/125.1 |
| 3,782,559 A | * | 1/1974 | Wright | B62H 3/12 211/17 |
| 3,872,972 A | * | 3/1975 | Cummins | B62H 3/02 211/17 |
| 3,921,869 A | * | 11/1975 | Rogers | B60R 9/10 224/500 |
| 3,924,751 A | * | 12/1975 | Ballenger | B62H 3/12 211/17 |
| 3,976,200 A | * | 8/1976 | Munns | B62H 3/12 211/18 |
| 4,009,744 A | * | 3/1977 | Joslyn | B60R 9/10 150/167 |
| 4,171,077 A | * | 10/1979 | Richard, Jr. | B60R 9/10 224/500 |

(Continued)

FOREIGN PATENT DOCUMENTS

KR     20100053039 A  *  5/2010

*Primary Examiner* — Patrick D Hawn
(74) *Attorney, Agent, or Firm* — Mohr Intellectual Property Law Solutions, PC

(57) ABSTRACT

Bike racks configured to mount to a hitch of a vehicle and to support a bike. The bike racks include a frame, a rack, and an adjustable hook. The frame is configured to selectively couple to the hitch of the vehicle. The rack is supported on the frame in a horizontal orientation and at an elevated position on the frame. The adjustable hook includes a first hook member and a second hook member spaced from the first hook member. The bike hangs vertically by a handlebar or a fork from the adjustable hook. The handlebar is tilted relative to the horizontal orientation of the rack when the handlebar or the fork is supported by the adjustable hook to allow tighter lateral packing of adjacent bikes. The spacing between the first hook member and the second hook member is adjustable.

12 Claims, 8 Drawing Sheets

(56) References Cited

U.S. PATENT DOCUMENTS

| | | | | |
|---|---|---|---|---|
| 4,296,879 A * | 10/1981 | Jordening | B60R 9/10 224/510 |
| 4,343,404 A * | 8/1982 | Folsom | B25H 1/0007 211/17 |
| 4,461,410 A * | 7/1984 | Tartaglia | B60R 9/10 224/519 |
| 4,513,897 A * | 4/1985 | Graber | B60R 9/10 211/5 |
| 4,948,021 A * | 8/1990 | Murphy | B60R 9/06 224/42.13 |
| 5,074,419 A * | 12/1991 | Smith | B62H 3/12 211/17 |
| 5,078,276 A * | 1/1992 | Rogge | B62H 3/12 211/18 |
| 5,085,360 A * | 2/1992 | Fortune | B60R 9/10 224/42.13 |
| 5,094,373 A * | 3/1992 | Lovci | B60R 9/06 224/282 |
| 5,190,195 A * | 3/1993 | Fullhart | B60R 9/10 224/497 |
| 5,219,105 A * | 6/1993 | Kravitz | B60R 9/06 224/500 |
| 5,261,507 A * | 11/1993 | Williams | E06C 7/48 182/214 |
| 5,294,006 A * | 3/1994 | Deschino | A47F 5/0853 211/103 |
| 5,330,084 A * | 7/1994 | Peters | B60R 9/06 211/171 |
| 5,372,287 A * | 12/1994 | Deguevara | B60R 9/06 224/309 |
| 5,402,979 A * | 4/1995 | Bellamy | B60R 11/00 182/127 |
| 5,447,241 A * | 9/1995 | Bureau | B62H 3/02 211/18 |
| 5,460,274 A * | 10/1995 | Kramer | B62H 3/12 211/17 |
| 5,526,971 A * | 6/1996 | Despain | B60R 9/06 224/519 |
| 5,579,972 A * | 12/1996 | Despain | B60R 9/10 224/506 |
| 6,161,702 A * | 12/2000 | Campbell | B62H 3/12 211/1.57 |
| 6,435,523 B1 * | 8/2002 | Hilk | B60R 9/10 224/426 |
| 6,460,745 B1 * | 10/2002 | Weaver | B60R 9/06 211/17 |
| 7,604,131 B1 * | 10/2009 | Clark | B62H 3/12 211/118 |
| 7,832,568 B2 * | 11/2010 | Wu | A47B 81/04 211/85.29 |
| 8,002,127 B2 * | 8/2011 | Ward | A47B 61/02 211/105.3 |
| 8,328,071 B2 * | 12/2012 | LaValley | B26D 3/16 228/49.3 |
| 8,757,397 B2 * | 6/2014 | Shaha | B62H 3/12 211/17 |
| 9,180,821 B1 * | 11/2015 | Freet | B62H 3/10 |
| 10,392,064 B2 * | 8/2019 | Rossiter | B62H 3/02 |
| 10,750,859 B1 * | 8/2020 | Fickett | A47B 55/02 |
| 10,850,678 B2 * | 12/2020 | McFadden | B60R 9/10 |
| 11,046,380 B1 * | 6/2021 | Gu | B62H 3/08 |
| 2002/0134742 A1 * | 9/2002 | Huang | F16M 13/027 211/17 |
| 2004/0050807 A1 * | 3/2004 | Cheng | B62H 3/12 211/17 |
| 2004/0217239 A1 * | 11/2004 | Chuang | F16M 11/28 248/125.8 |
| 2005/0104305 A1 * | 5/2005 | Chan | B60R 9/048 280/7.11 |
| 2006/0237505 A1 * | 10/2006 | Hammond | B60R 9/10 224/521 |
| 2007/0119889 A1 | 5/2007 | Hammond | |
| 2010/0237027 A1 * | 9/2010 | Shaha | B62H 3/12 211/17 |
| 2010/0237213 A1 * | 9/2010 | Wang | B62H 3/12 248/324 |
| 2012/0043286 A1 * | 2/2012 | Noyes | B62H 3/12 211/22 |
| 2012/0181397 A1 * | 7/2012 | Huang | F16B 2/246 248/121 |
| 2013/0327802 A1 * | 12/2013 | Hammond | B62H 3/12 224/519 |
| 2015/0083769 A1 * | 3/2015 | Williams | B60R 9/06 224/488 |
| 2018/0086279 A1 * | 3/2018 | Anton | B60R 9/00 |
| 2019/0047483 A1 * | 2/2019 | Wilterdink | B60R 9/06 |
| 2019/0210675 A1 * | 7/2019 | Clark | B62H 3/12 |

* cited by examiner

BIKE RACKS INCLUDING ADJUSTABLE HOOKS

CROSS REFERENCE TO RELATED APPLICATIONS

This application claims priority to U.S. Application Ser. No. 63/114,263, filed on Nov. 16, 2020, which is hereby incorporated by reference for all purposes.

BACKGROUND

The present disclosure relates generally to bike racks. In particular, bike racks including adjustable hooks are described.

Bike racks provide a convenient way to store and transport bicycles. Bike racks are commonly mounted to vehicles and to walls. Some bike racks are configured to support a single bicycle while others are configured to support multiple bicycles.

Known bike racks are not entirely satisfactory for the range of applications in which they are employed. For example, existing bike racks are often limited to supporting only a single type and size of bicycle. A conventional bike rack that can support one type of bike, such as road bikes, is typically unable to also support other types of bikes, such as mountain bikes or children's bikes. Conventional bike racks are also generally limited to supporting bikes of approximately the same size and are unable to support multiple bikes of different sizes.

The limited ability of existing bike racks to support different types and sizes of bikes reduces their usefulness. For example, conventional bike racks limit the types and sizes of bicycles one can store or transport for a group of users. A group wishing to travel with their bikes in a single vehicle must all use the same type or size of bike with bike racks currently available. However, different people often prefer or need to use different types or sizes of bikes.

The limitations of conventional bike racks mean that one may need to undesirably purchase and install multiple bike racks to accommodate different types of bikes. Purchasing multiple bike racks may represent a significant expense. Further, it may not always be feasible to install multiple bike racks on a vehicle or in the space available in a storage area.

In addition, conventional bike racks require an undesirably large footprint to store multiple bikes. Existing bike racks are unable to store multiple bikes in a space saving configuration, which makes them cumbersome to use and limits the number of bikes that can be mounted to existing bike racks in a given space allotment. It would be desirable for a bike rack to support multiple bikes in less space than is currently possible.

Thus, there exists a need for bike racks that improve upon and advance the design of known bike racks. Examples of new and useful bike racks relevant to the needs existing in the field are discussed below.

United States patent filings with disclosure relevant to bike racks include the following U.S. patent filings identified by either patent number, publication number, or application number: US20130327802A1, U.S. Pat. Nos. 3,921,869A, 5,447,241, US20040050807A1, U.S. Pat. No. 6,161,702A, US624231, U.S. Pat. Nos. 6,460,745, 7,604,131, US20180086279A1, U.S. Pat. Nos. 9,180,821, 5,261,507, 5,460,274, 8,328,071, US20070119889A1, US20050104305A1, U.S. Pat. Nos. 6,435,523, and 3,976,200. The complete disclosures of these listed U.S. patent filings are herein incorporated by reference for all purposes.

SUMMARY

The present disclosure is directed to bike racks configured to mount to a hitch of a vehicle and to support a bike with a handlebar and a fork. The bike racks include a frame, a rack, and an adjustable hook.

The frame is configured to selectively couple to the hitch of the vehicle. The rack is supported on the frame in a horizontal orientation and at an elevated position on the frame.

The adjustable hook includes a first hook member and a second hook member spaced from the first hook member. The adjustable hook is complementarily configured with the handlebar and the fork. The bike hangs vertically by the handlebar or the fork from the adjustable hook. The second hook member is disposed below the first hook member such that the handlebar is tilted relative to the horizontal orientation of the rack when the handlebar or the fork is supported by the adjustable hook to allow tighter lateral packing of adjacent bikes. The spacing between the first hook member and the second hook member is adjustable.

DETAILED DESCRIPTION

Figure 1:
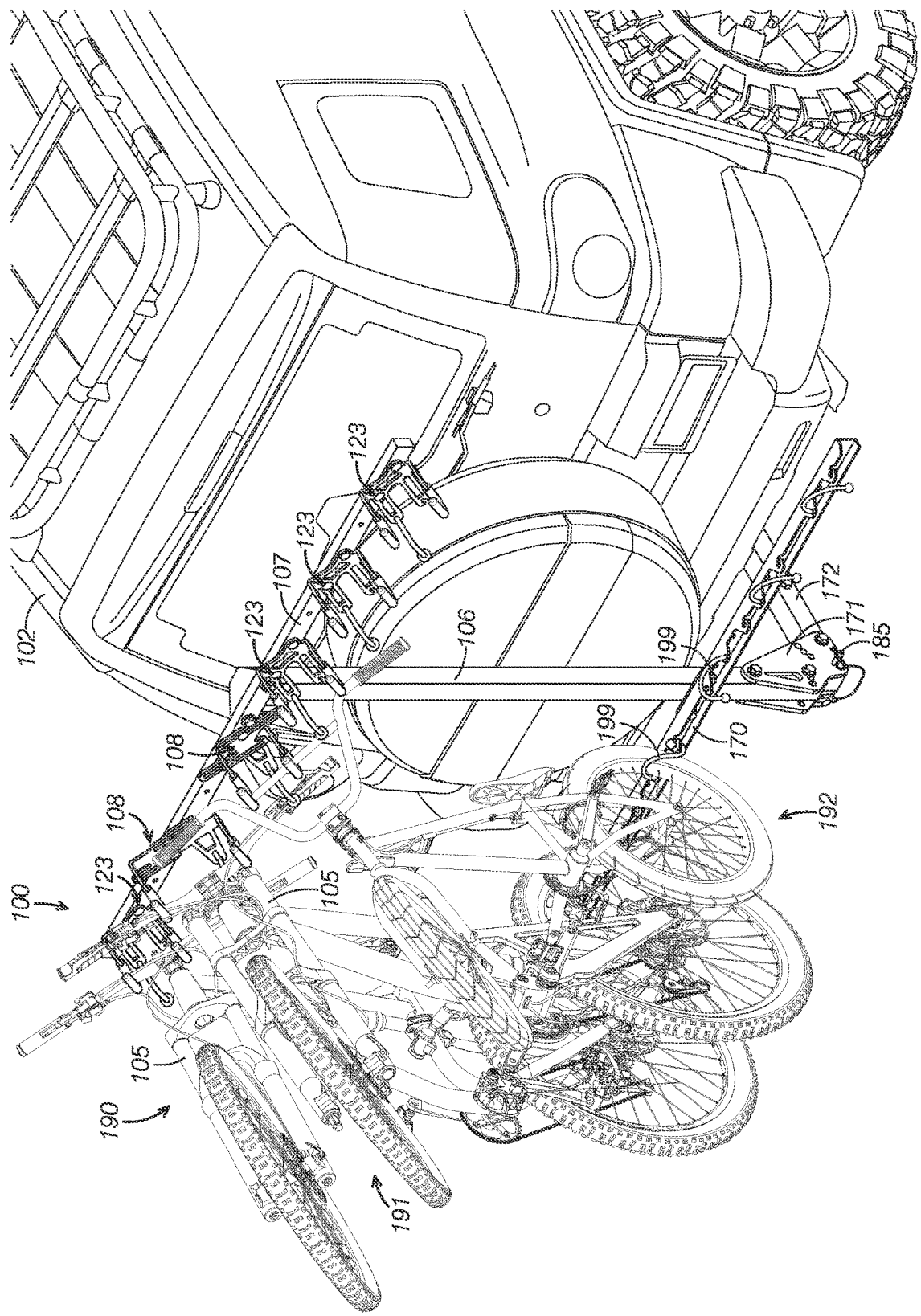
FIG. 1 is a front perspective view of a first embodiment of a bike rack mounted to a vehicle, the bike rack includes a fixed hook supporting a first bike with a single crown fork, a first adjustable hook supporting a second bike with dual crown forks, and a second adjustable hook supporting a third bike sized for a child.

The disclosed bike racks will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various bike racks are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device exchanges information with another electronic device, either wirelessly or with a wire-based connector, whether directly or indirectly through a communication network.

"Controllably coupled" means that an electronic device controls operation of another electronic device.

Bike Racks Including Adjustable Hooks

With reference to the figures, bike racks including adjustable hooks will now be described. The bike racks discussed herein function to support multiple bikes of different sizes and types in a space saving configuration.

The reader will appreciate from the figures and description below that the presently disclosed bike racks address many of the shortcomings of conventional bike racks. For example, the bike racks discussed herein are able to support multiple types and sizes of bikes rather than just a single type and size of bike like conventional bike racks. The presently disclosed bike racks can readily support road bikes, mountain bikes, and children's bikes. Further, the bike racks discussed in this document are configured to support multiple bikes of different sizes.

The expanded abilities of the present bike racks compared to existing bike racks provide more flexibility and convenience to users of the bike rack. For example, a group wishing to travel with their bikes in a single vehicle have the freedom to bring different types and sizes of bikes using the bike racks discussed herein. The bike racks discussed below avoid the need to purchase and install multiple bike racks to accommodate different types and sizes of bikes.

In addition, the presently disclosed bike racks require a smaller footprint than conventional bike racks to store multiple bikes. The bike racks discussed herein are able to store multiple bikes in a space saving configuration, which makes them convenient to use and increases the number of bikes that can be stored in a given space. The bike racks discussed below advantageously allow multiple bikes to be supported in less space than is currently possible.

Contextual Details

Ancillary features relevant to the bike racks described herein will first be described to provide context and to aid the discussion of the bike racks.

Vehicle

The bike racks discussed below are configured to mount to a vehicle. FIG. 1 depicts a vehicle 102 to which bike rack 100 is mounted. Vehicle 102 is a sport utility vehicle with a towing receiver, but the vehicle may be any currently known or later developed type of vehicle. The reader will appreciate that a variety of vehicle types exist and could be used in place of the vehicle shown in FIG. 1. In addition to the types of vehicles existing currently, it is contemplated that the bike racks described herein could be used with new types of vehicles developed in the future.

Bike

Bicycles are supported by the bike racks discussed below. The bike racks are configured to support a wide variety of bike types. Three different types of bikes are shown in FIG. 1: a bike 190 sized for an adult with a single crown fork, a bike 191 sized for an adult with a dual crown fork, and a bike 192 sized for a child. In the present example, the bikes depicted are mountain bikes, but may be road bikes, cruiser bikes, or other types of bikes in other examples.

The bike may be any currently known or later developed type of bike. The reader will appreciate that a variety of bike types exist and could be used in place of the bikes shown in the figures. In addition to the types of bikes existing currently, it is contemplated that the bike racks described herein could be used with new types of bikes developed in the future.

Bikes 190-192 include a bike frame 103, a handlebar 104, a fork 105, a front wheel 193, and a rear wheel 194 among other features. Whereas fork 105 of bike 190 has a single crown, fork 105 of bike 191 has a dual crown. Bicycles may include most any bicycle feature currently known or later developed and remain compatible with the bike racks discussed herein.

The number of bikes supported by the bike rack may be selected to meet the needs of a given application. For example, the bike rack depicted in the figures is configured to support six bikes, but only three bikes are shown being supported in FIG. 1 and one bike is shown being supported in other figures. The reader should appreciate that the number of bikes may be different in other examples than is shown in the figures. For instance, some bike rack examples include additional or fewer bikes than described in the present example.

The size of a bike supported by the bike racks described below may be varied as needed for a given application. In some examples, the bike is larger relative to the bike rack than depicted in the figures. In other examples, the bike is smaller relative to the bike rack than depicted in the figures. Further, the reader should understand that the bike and the bike rack may all be larger or smaller than described herein while maintaining their relative proportions.

Bike Rack Embodiment One

With reference to FIGS. 1-8, a bike rack 100 will now be described as a first example of a bike rack. As depicted in FIG. 1, bike rack 100 is configured to mount to a hitch 101 of a vehicle 102 and to support bikes 190-192. With reference to FIGS. 1-4, bike rack 100 includes a frame 106, a rack 107, an arm 170, a joint 171, a tongue 172, two adjustable hooks 108, and four fixed hooks 123. In other examples, the bike rack includes fewer components than depicted in the figures, such as not including a fixed hook or an arm. In certain examples, the bike rack includes additional or alternative components than depicted in the figures.

The shape of the bike rack may be adapted to be different than the specific examples shown in the figures to suit a given application.

The size of the bike rack may be varied as needed for a given application. In some examples, the bike rack is larger relative to the bikes and vehicle than depicted in the figures. In other examples, the bike rack is smaller relative to the bikes and vehicle than depicted in the figures. Further, the reader should understand that the bike rack and the other components may all be larger or smaller than described herein while maintaining their relative proportions.

Frame

The role of frame 106 is to support other components of bike rack 100, including rack 107 and arm 170. As shown in FIG. 1, frame 106 is configured to selectively couple to the towing receiver of vehicle 102 via tongue 172 and joint 171.

The frame may be any currently known or later developed type of frame. The reader will appreciate that a variety of frame types exist and could be used in place of the frame shown in the figures. In addition to the types of frames existing currently, it is contemplated that the bike racks described herein could incorporate new types of frames developed in the future.

In the present example, the frame is a tubular member with a square cross section. However, the shape of the frame may be adapted to be different than the specific examples shown in the figures to suit a given application. For example, the frame may include a face having the shape of a regular or irregular polygon, such as a circle, oval, triangle, square, rectangle pentagon, and the like. Additionally or alternatively, the frame may include a face having an irregular shape. In three dimensions, the shape of the frame may be a sphere, a pyramid, a cone, a cube, and variations thereof, such as a hemisphere or a frustoconical shape.

The size of the frame may be varied as needed for a given application. In some examples, the frame is larger relative to the other components than depicted in the figures. In other examples, the frame is smaller relative to the other components than depicted in the figures. Further, the reader should understand that the frame and the other components may all be larger or smaller than described herein while maintaining their relative proportions.

In the present example, the frame is composed of steel. However, the frame may be composed of any currently known or later developed material suitable for the applications described herein for which it is used. Suitable materials include metals, polymers, ceramics, wood, and composite materials.

Rack

Figure 6:
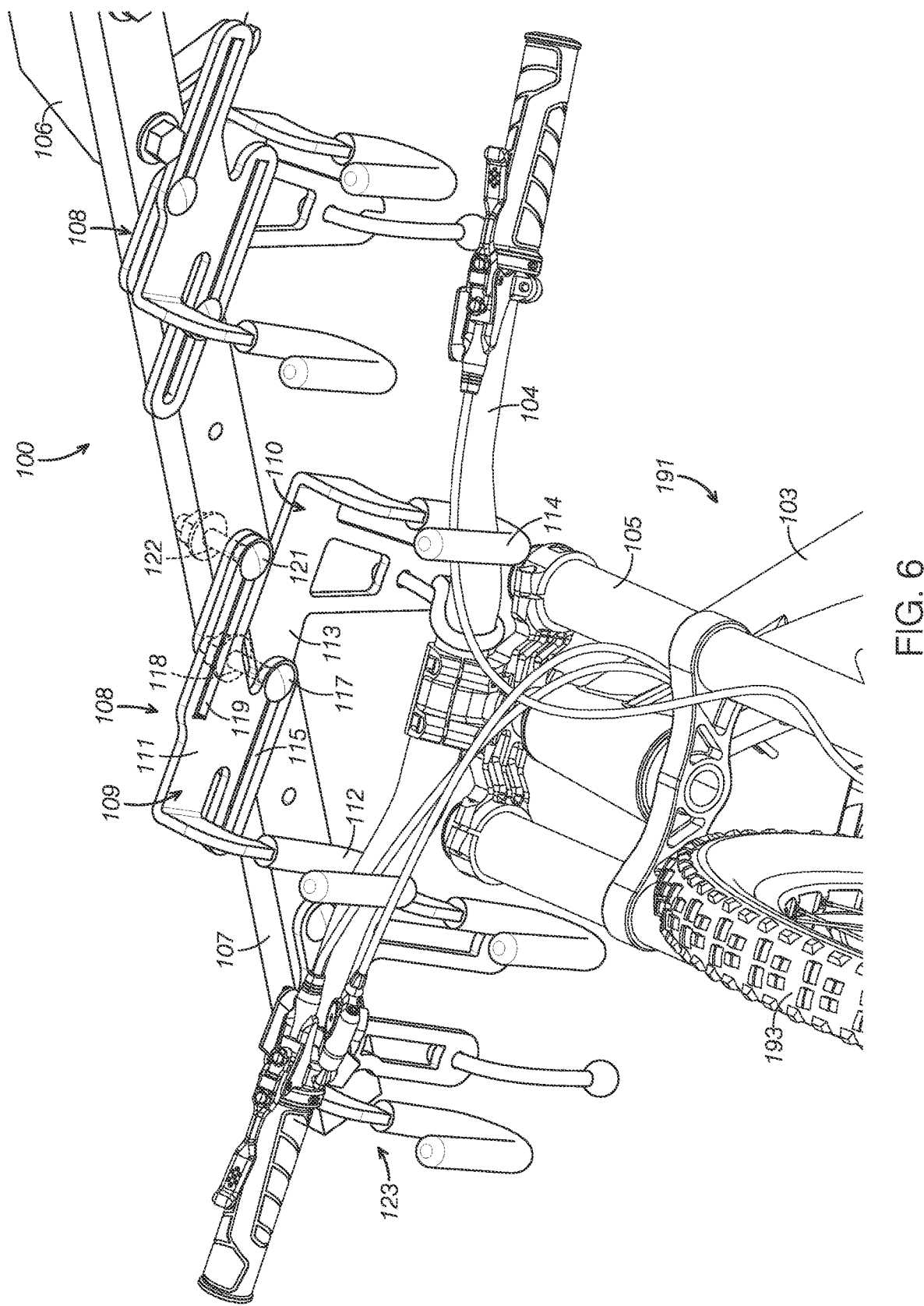
FIG. 6 is a front perspective view of the first adjustable hook shown in FIG. 1 supporting the second bike with dual crown forks.

Rack 107 functions to support a plurality of fixed and adjustable hooks and to support bikes hanging from the fixed and adjustable hooks. The reader can see in FIGS. 1-4 that rack 107 is supported on frame 106 in a horizontal orientation. Rack 107 is supported at an elevated position on frame 106 spaced from arm 170, joint 171, and tongue 172. As depicted in FIG. 6, rack 107 defines a first port 118 and a second port 122.

Rack 107 extends transverse to frame 106 from a first lateral end to a second lateral end. In the present example, rack 107 extends horizontally. Rack 107 is coupled to frame 106 at the approximate lateral midpoint of rack 107.

Rack 107 supports half of the hooks on a first lateral side and the other half of the hooks on the opposite lateral side of rack 107. However, the rack could support different numbers of hooks on each lateral side or no hooks on one lateral side. In the present example, rack supports two adjustable hooks 108 and one fixed hook 123 on a first lateral side and three fixed hooks 123 on the other lateral side. In other examples, one or more lateral sides has a different mix of fixed and adjustable hooks.

The rack may be any currently known or later developed type of rack. The reader will appreciate that a variety of rack types exist and could be used in place of the rack shown in the figures. In addition to the types of racks existing currently, it is contemplated that the bike racks described herein could incorporate new types of racks developed in the future.

The number of racks in the bike rack may be selected to meet the needs of a given application. The reader should appreciate that the number of racks may be different in other examples than is shown in the figures. For instance, some bike rack examples include additional or fewer racks than described in the present example.

The shape of the rack may be adapted to be different than the specific examples shown in the figures to suit a given application. For example, the rack may include a face having the shape of a regular or irregular polygon, such as a circle, oval, triangle, square, rectangle pentagon, and the like. Additionally or alternatively, the rack may include a face having an irregular shape. In three dimensions, the shape of the rack may be a sphere, a pyramid, a cone, a cube, and variations thereof, such as a hemisphere or a frustoconical shape.

The size of the rack may be varied as needed for a given application. In some examples, the rack is larger relative to the other components than depicted in the figures. In other examples, the rack is smaller relative to the other components than depicted in the figures. Further, the reader should understand that the rack and the other components may all be larger or smaller than described herein while maintaining their relative proportions.

In the present example, the rack is composed of steel. However, the rack may be composed of any currently known or later developed material suitable for the applications described herein for which it is used. Suitable materials include metals, polymers, ceramics, wood, and composite materials.

Ports

The role of the ports is to receive bolts of the hooks to secure the hooks to the rack. In the present example, as shown in FIG. 6, a first port 118 receives a first bolt 117 of adjustable hook 118 to couple adjustable hook 108 to rack 107. The reader can see in FIG. 6 that a second port 122 receives a second bolt 121 of adjustable hook 108 to couple adjustable hook 108 to rack 107.

Arm

Arm 170 functions to support rear wheel 194 when bike 190 hangs by handlebar 104 from a fixed or adjustable hook. In particular, arm 170 maintains rear wheel 194 in a spaced position from the vehicle or wall as bike 190 hangs by handlebar 104 from the fixed or adjustable hook.

Without arm 170, rear wheel 194 would tend to move closer to the vehicle or wall as bike 190 hangs from bike rack 100. Further, rear wheel 194 would tend to move dynamically closer and farther from the vehicle as the vehicle moves without arm 170 to hold rear wheel 194 in a defined position.

In some examples, the arm is disposed further from the vehicle or wall than the rack, which allows the bike to be supported in a vertically tilted orientation. The vertically tilted orientation may help the bike hang more stably from the fixed or adjustable hook because gravity pushes the rear wheel against the arm.

As shown in FIG. 1, bike rack 100 includes a wheel coupler 199 to couple rear wheel 194 to arm 170. However, the wheel coupler is an optional feature not present in all examples of the bike rack. In the present example, wheel coupler 199 is similar to retention member 127 discussed below and includes an elongate tension bearing member and two bosses.

In the present example, arm 170 is comprised of steel. However, the arm may be composed of any currently known or later developed material suitable for the applications described herein. Suitable materials include metals, polymers, wood, and composite materials.

The size of the arm may be varied as needed for a given application. In some examples, the arm is larger relative to the other components than depicted in the figures. In other examples, the arm is smaller relative to the other components than depicted in the figures. Further, the reader should understand that the arm and the other components may all be larger or smaller than described herein while maintaining their relative proportions.

The shape of the arm may be adapted to be different than the specific examples shown in the figures to suit a given application. For example, the arm may have a curved outer face or depressions or channels configured to receive wheels and provide lateral stability to them.

The number of arms in the bike rack may be selected to meet the needs of a given application. The reader should understand that the number of arms may be different in other examples than is shown in the figures. For instance, some bike rack examples include additional or fewer arms than described in the present example, such as no arm, two arms, or more than two arms.

The arm may be any currently known or later developed type of structural member. The reader will appreciate that a variety of structural member types exist and could be used in place of the arm shown in the figures. In addition to the types of structural members existing currently, it is contemplated that the arm described herein could incorporate new types of structural members developed in the future.

Joint

Joint 171 functions to pivot frame 106 relative to tongue 172 between a support configuration and an access configuration. Joint 171 enabling bike rack 100 to move between the support configuration and the access configuration provides the user with convenient means to access the rear of vehicle 102 to which bike rack 100 is mounted. Additionally or alternatively, the pivoting function of joint 171 makes loading and unloading bikes onto and off of the fixed or adjustable hook easier by lowering rack 107 to a more convenient height.

Figure 4:
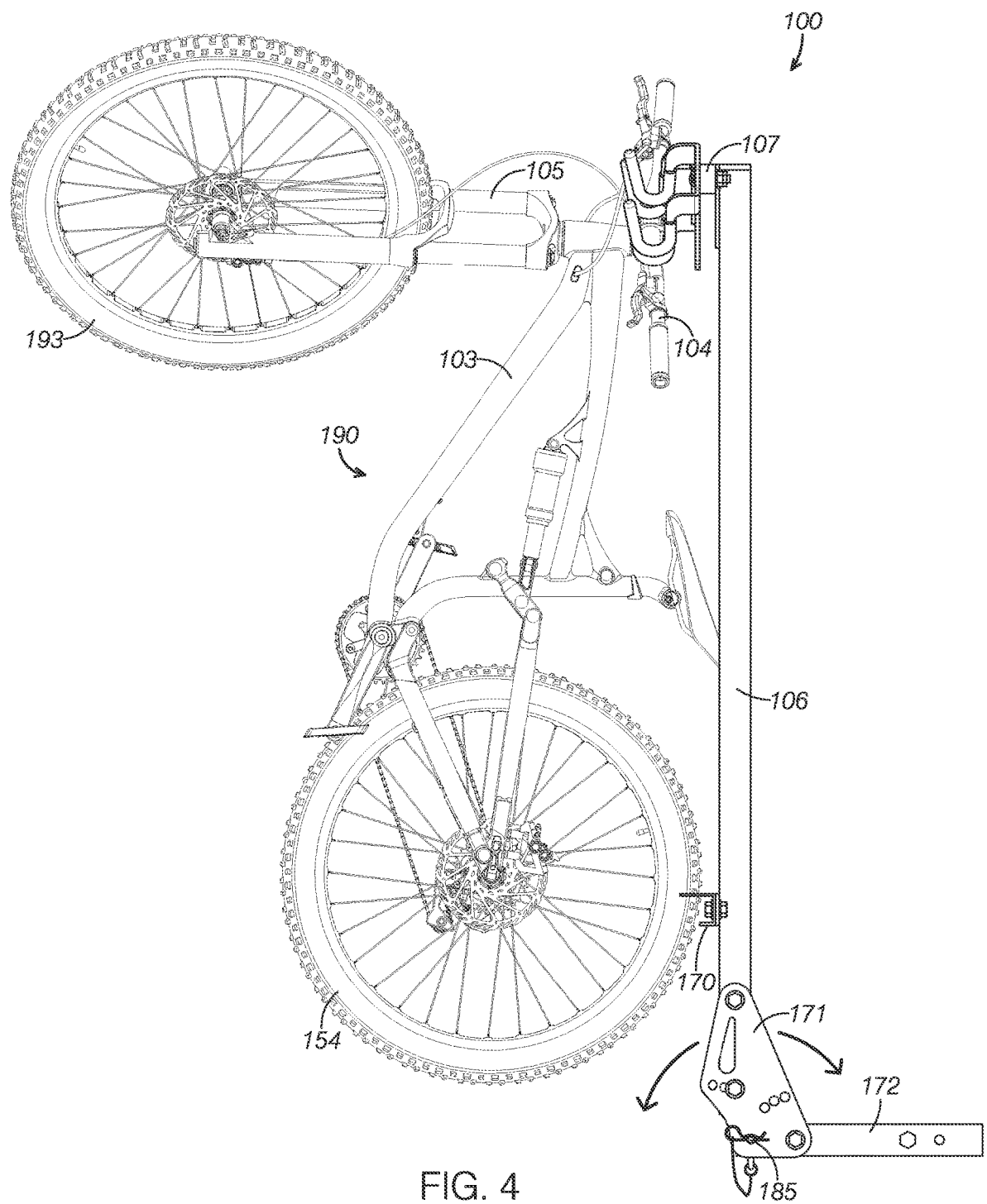
FIG. 4 is a side elevation view of the bike rack shown in FIG. 1 supporting a single bike.

As shown by the pivot arrows in FIG. 4, frame 106 may extend at an angle past vertical leaning towards the vehicle in the support configuration with arm 170 spaced farther away from the vehicle or wall than rack 107. Through selective removal of a pin 185, which locks joint 171 in position, joint 171 enables frame 106 to pivot relative to tongue 172 from the support position to access the access configuration.

When moved to the access configuration, frame 106 extends an angle between vertical and horizontal with rack 107 spaced farther from the vehicle or wall than it is in the support configuration. In the access configuration depicted in FIG. 4, frame 106 is substantially vertical with rack 107 disposed directly above arm 170. In the access configuration, rack 107 may be spaced farther from the vehicle or wall than arm 170.

Joint 171 further allows tongue 172 to pivot to a stowed configuration. In the stowed configuration, tongue 172 abuts frame 106. The stowed configuration conveniently limits the extent to which tongue 172 extends from frame 106, which reduces its potential to be a trip hazard. The stowed configuration also enables bike rack 100 to mount to a wall more flush than would be possible if tongue 172 was extended.

In the present example, joint 171 is comprised of steel. However, the joint may be composed of any currently known or later developed material suitable for the applications described herein for which it is used. Suitable materials include metals, polymers, wood, and composite materials.

The size of the joint may be varied as needed for a given application. In some examples, the joint is larger relative to the other components than depicted in the figures. In other examples, the joint is smaller relative to the other components than depicted in the figures. Further, the reader should understand that the joint and the other components may all be larger or smaller than described herein while maintaining their relative proportions.

The size of the joint may be varied as needed for a given application. In some examples, the joint is larger relative to the other components than depicted in the figures. In other examples, the joint is smaller relative to the other components than depicted in the figures. Further, the reader should understand that the joint and the other components may all be larger or smaller than described herein while maintaining their relative proportions.

The shape of the joint may be adapted to be different than the specific examples shown in the figures to suit a given application. The joint may be any currently known or later developed type of joint. The reader will appreciate that a variety of joint types exist and could be used in place of the joint shown in the figures. In addition to the types of joints existing currently, it is contemplated that the joints described herein could incorporate new types of joints developed in the future.

Tongue

Tongue 172 functions to couple bike rack 100 to a towing receiver of vehicle 102. In particular, tongue 172 is configured to insert into the towing receiver of vehicle 102. The size and shape of tongue 172 complements the size and shape of the towing receiver.

In the present example, tongue 172 is a tubular member with a square cross section. However, the shape of the tongue may be adapted to be different than the specific examples shown in the figures to suit a given application. In other examples, the cross section of the tongue is circular, oval, triangular, another regular polygon, or an irregular shape.

The tongue may be any currently known or later developed type of tongues or trailer couplers. The reader will appreciate that a variety of tongue or trailer coupler types exist and could be used in place of the tongues shown in the figures. In addition to the types of tongues or trailer couplers existing currently, it is contemplated that the tongues described herein could incorporate new types of tongues or trailer couplers developed in the future.

In the present example, tongue 172 is comprised of steel. However, the tongue may be composed of any currently known or later developed material suitable for the applications described herein for which it is used. Suitable materials include metals, polymers, wood, and composite materials.

Adjustable Hook

Adjustable hook 108 functions to support a bike in a hanging configuration and to accommodate bikes of different sizes or configurations by selectively widening and narrowing. The reader can see in FIGS. 1 and 6 that adjustable hook 108 is complementarily configured with handlebar 104 and fork 105 of bike 191. Bike 191 hangs vertically by handlebar 104 from adjustable hook 108.

Figure 5A:
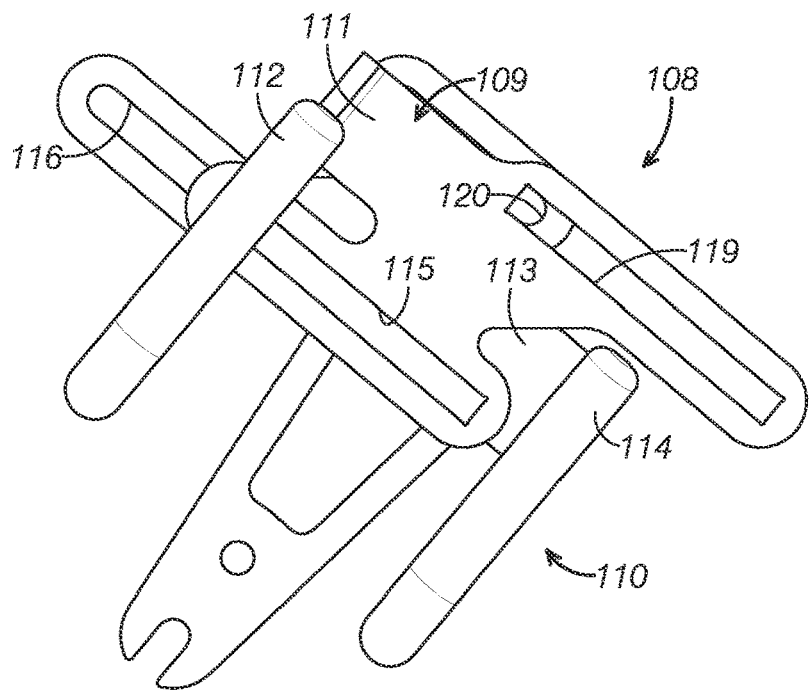
FIG. 5A is a front view of the first adjustable hook shown in FIG. 1 depicted in a narrow configuration.

As shown in FIGS. 5A-6, adjustable hook 108 includes a first hook member 109, a second hook member 110, a first bolt 117, and a second bolt 121. First hook member 109 and second hook member 110 are configured to selectively move relative to each other to cooperatively support bikes of different sizes and configurations.

The adjustable hook may be any currently known or later developed type of adjustable hook. The reader will appreciate that a variety of adjustable hook types exist and could be used in place of the adjustable hook shown in the figures. In addition to the types of adjustable hooks existing currently, it is contemplated that the bike racks described herein could incorporate new types of adjustable hooks developed in the future.

The number of adjustable hooks in the bike rack may be selected to meet the needs of a given application. The reader should appreciate that the number of adjustable hooks may be different in other examples than is shown in the figures. For instance, some bike rack examples include additional or fewer adjustable hooks than described in the present example.

The shape of the adjustable hook may be adapted to be different than the specific examples shown in the figures to suit a given application. For example, the adjustable hook may include a face having the shape of a regular or irregular polygon, such as a circle, oval, triangle, square, rectangle pentagon, and the like. Additionally or alternatively, the adjustable hook may include a face having an irregular shape. In three dimensions, the shape of the adjustable hook may be a sphere, a pyramid, a cone, a cube, and variations thereof, such as a hemisphere or a frustoconical shape.

The size of the adjustable hook may be varied as needed for a given application. In some examples, the adjustable hook is larger relative to the other components than depicted in the figures. In other examples, the adjustable hook is smaller relative to the other components than depicted in the figures. Further, the reader should understand that the adjustable hook and the other components may all be larger or smaller than described herein while maintaining their relative proportions.

In the present example, the adjustable hook is composed of steel. However, the adjustable hook may be composed of any currently known or later developed material suitable for the applications described herein for which it is used. Suitable materials include metals, polymers, ceramics, wood, and composite materials.

Hook Members of Adjustable Hooks

Figure 5B:
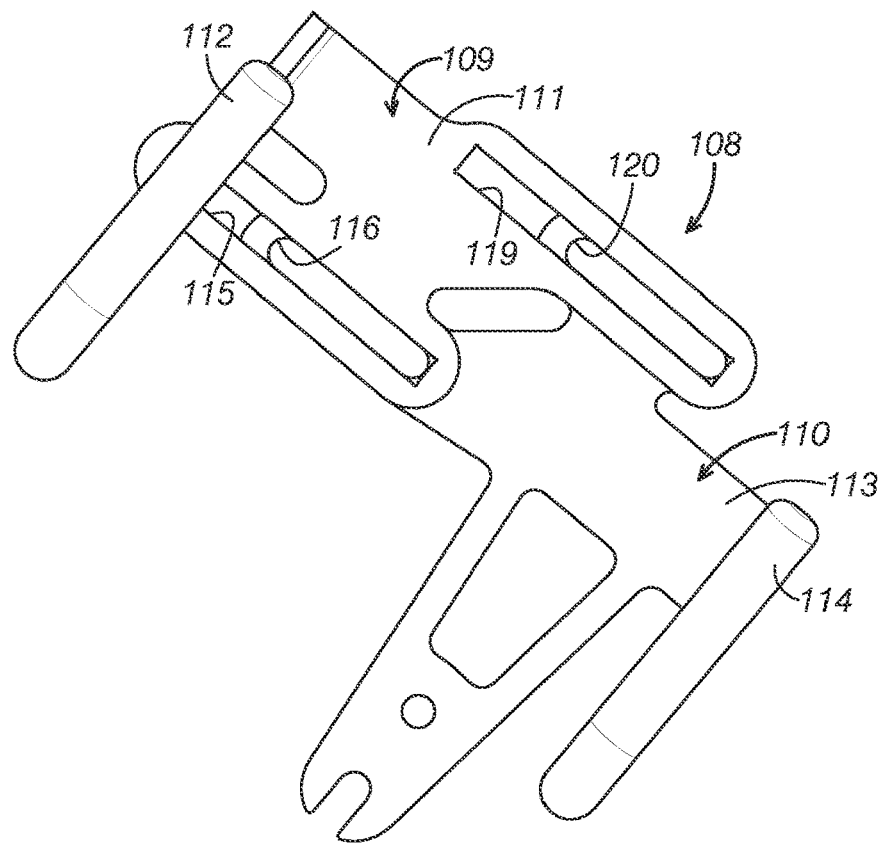
FIG. 5B is a front view of the first adjustable hook shown in FIG. 1 depicted in a wide configuration.

The hook members function to selectively move relative to each other to cooperatively support bikes of different sizes and configurations. As depicted in FIGS. 5A-6, the spacing between first hook member 109 and second hook member 110 is adjustable. FIG. 5A depicts adjustable hook 108 with first hook member 109 and second hook member 110 in a narrow configuration whereas FIG. 5B depicts a wide configuration.

With reference to FIGS. 1-6, second hook member 110 is disposed below first hook member 109 such that handlebar 104 is tilted relative to the horizontal orientation of rack 107 when handlebar 104 or fork 105 is supported by adjustable hook 108. As shown in FIG. 1, the tilted orientation allows tighter lateral packing of adjacent bikes.

As shown in FIGS. 5A-6, first hook member 109 includes a first plate 111 and a first hook 112. The reader can see in FIGS. 5A-6 that second hook member 110 includes a second plate 113 and a second hook 114.

Hooks

The hooks serve to support bikes by the handlebar or the fork of the bikes resting on the hooks. As shown in FIGS. 5A-6, first hook 112 extends from first plate 111 and second hook 114 extends from second plate 113. With reference to FIGS. 5A-6, second hook 114 is spaced from first hook 112. The spacing between first hook 112 and second hook 114 is selectively adjustable by moving first hook member 109 and second hook member 110 relative to each other.

Plates

The plates serve to support the hooks and to define slots for selectively fixing the position of the adjustable hook and for coupling the adjustable hook to the rack. The reader can see in FIGS. 5A-6 that second plate 113 abuts first plate 111. As depicted in FIGS. 5A-6, first plate 111 is configured to selectively translate relative to second plate 113 to adjust the spacing between first hook and second hook 114.

With reference to FIGS. 5A-6, first plate 111 defines a first slot 115 and a second slot 119. As shown in FIGS. 5A-6, second plate 113 defines a third slot 116 aligned with first slot 115. As depicted in FIGS. 5A-6, second plate 113 defines a fourth slot 120 aligned with second slot 119.

Slots

The slots serve to receive bolts to selectively fix the position of the adjustable hook and for coupling the adjustable hook to the rack. With reference to FIGS. 5A-6, first slot 115, second slot 119, third slot 116, and fourth slot 120 extend in the direction that first plate 111 translates relative to second plate 113.

Bolts

The role of the bolts is to cooperate with the slots to selectively fix the width of the adjustable hook and to couple the adjustable hook to the rack. With reference to FIGS. 5A-6, first bolt 117 extends through first slot 115, third slot 116, and first port 118 of rack 107 to couple adjustable hook 108 to rack 107. First bolt 117 extending through first slot 115 and third slot 116 also couples first plate 111 to second plate 113 and restricts first plate 111 from translating relative to second plate 113.

By referring to FIGS. 5A-6, the reader can see that second bolt 121 extends through second slot 119, fourth slot 120, and second port 122 to couple adjustable hook 108 to rack 107. With reference to FIG. 6, second bolt 121 extending through second slot 119 and fourth slot 120 couples first plate 111 to second plate 113 and restricts first plate 111 from translating relative to second plate 113.

Fixed Hook

Figure 2:
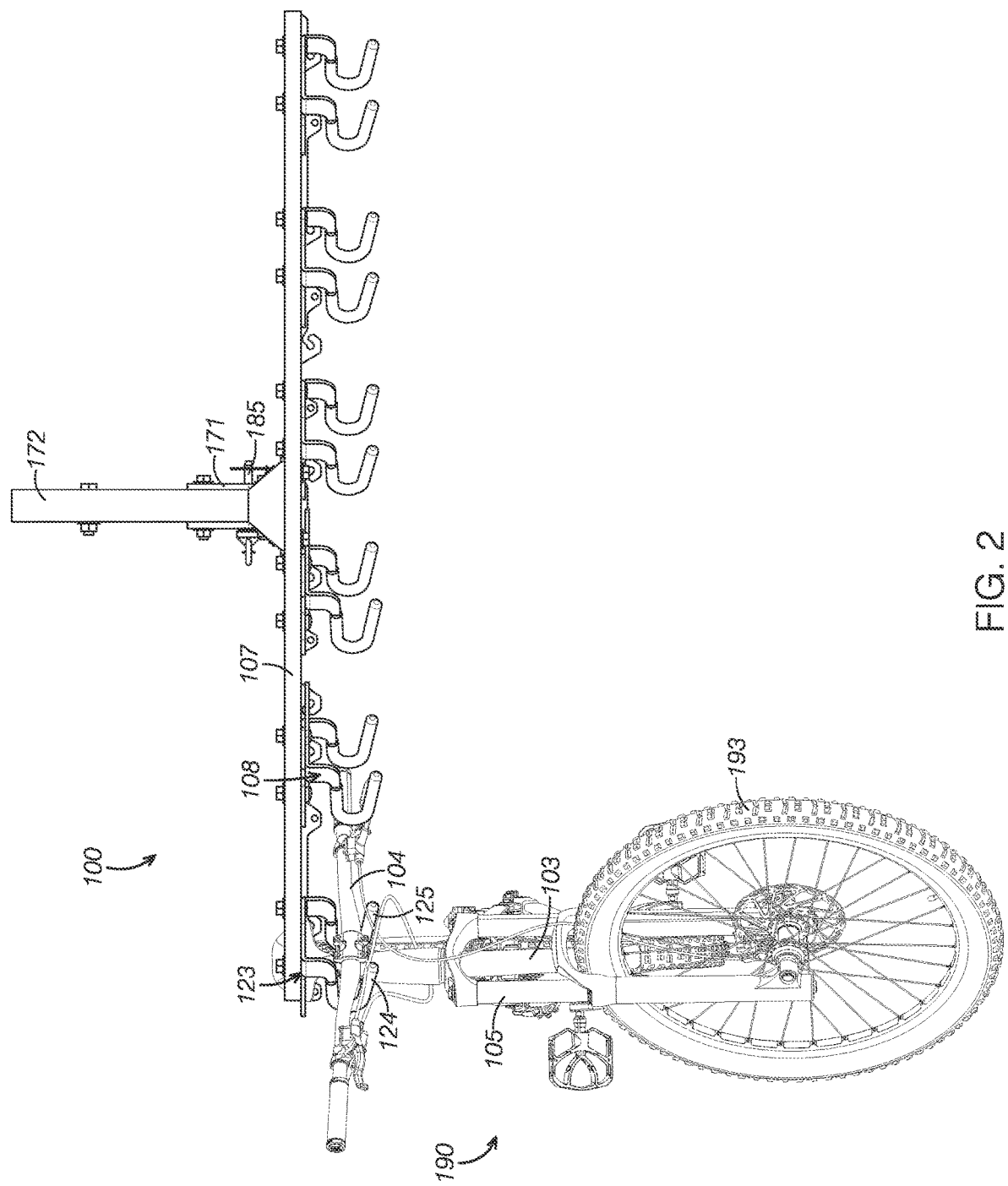
FIG. 2 is a top view of the bike rack shown in FIG. 1 supporting a single bike.
Figure 3:
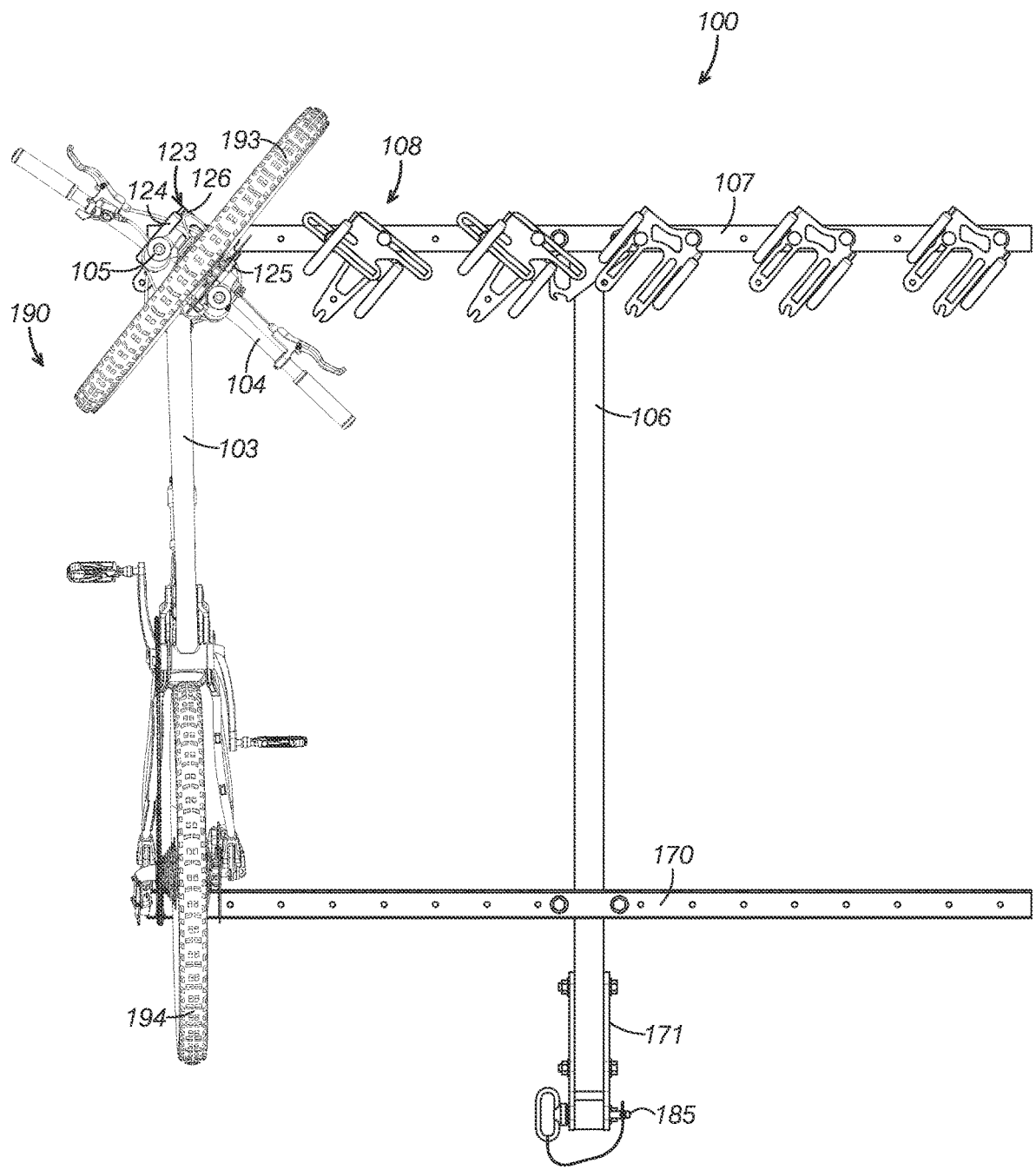
FIG. 3 is a front elevation view of the bike rack shown in FIG. 1 supporting a single bike.

Fixed hook 123 functions to support a bike in a hanging configuration. As depicted in FIGS. 1-3, fixed hook 123 is coupled to rack 107 adjacent to adjustable hooks 108 and is configured to support bike 190. The reader can see in FIGS. 3 and 7 that fixed hook 123 includes a body 126, a retention member 127, third hook member 124, and fourth hook member 125.

The fixed hook may be any currently known or later developed type of fixed hook. The reader will appreciate that a variety of fixed hook types exist and could be used in place of the fixed hook shown in the figures. In addition to the types of fixed hooks existing currently, it is contemplated that the bike racks described herein could incorporate new types of fixed hooks developed in the future.

The number of fixed hooks in the bike rack may be selected to meet the needs of a given application. The reader should appreciate that the number of fixed hooks may be different in other examples than is shown in the figures. For instance, some bike rack examples include additional or fewer fixed hooks than described in the present example.

The shape of the fixed hook may be adapted to be different than the specific examples shown in the figures to suit a given application. For example, the fixed hook may include a face having the shape of a regular or irregular polygon, such as a circle, oval, triangle, square, rectangle pentagon, and the like. Additionally or alternatively, the fixed hook may include a face having an irregular shape. In three dimensions, the shape of the fixed hook may be a sphere, a pyramid, a cone, a cube, and variations thereof, such as a hemisphere or a frustoconical shape.

The size of the fixed hook may be varied as needed for a given application. In some examples, the fixed hook is larger relative to the other components than depicted in the figures. In other examples, the fixed hook is smaller relative to the other components than depicted in the figures. Further, the reader should understand that the fixed hook and the other components may all be larger or smaller than described herein while maintaining their relative proportions.

In the present example, the fixed hook is composed of steel. However, the fixed hook may be composed of any currently known or later developed material suitable for the applications described herein for which it is used. Suitable materials include metals, polymers, ceramics, wood, and composite materials.

Hook Members of Fixed Hooks

Figure 7:
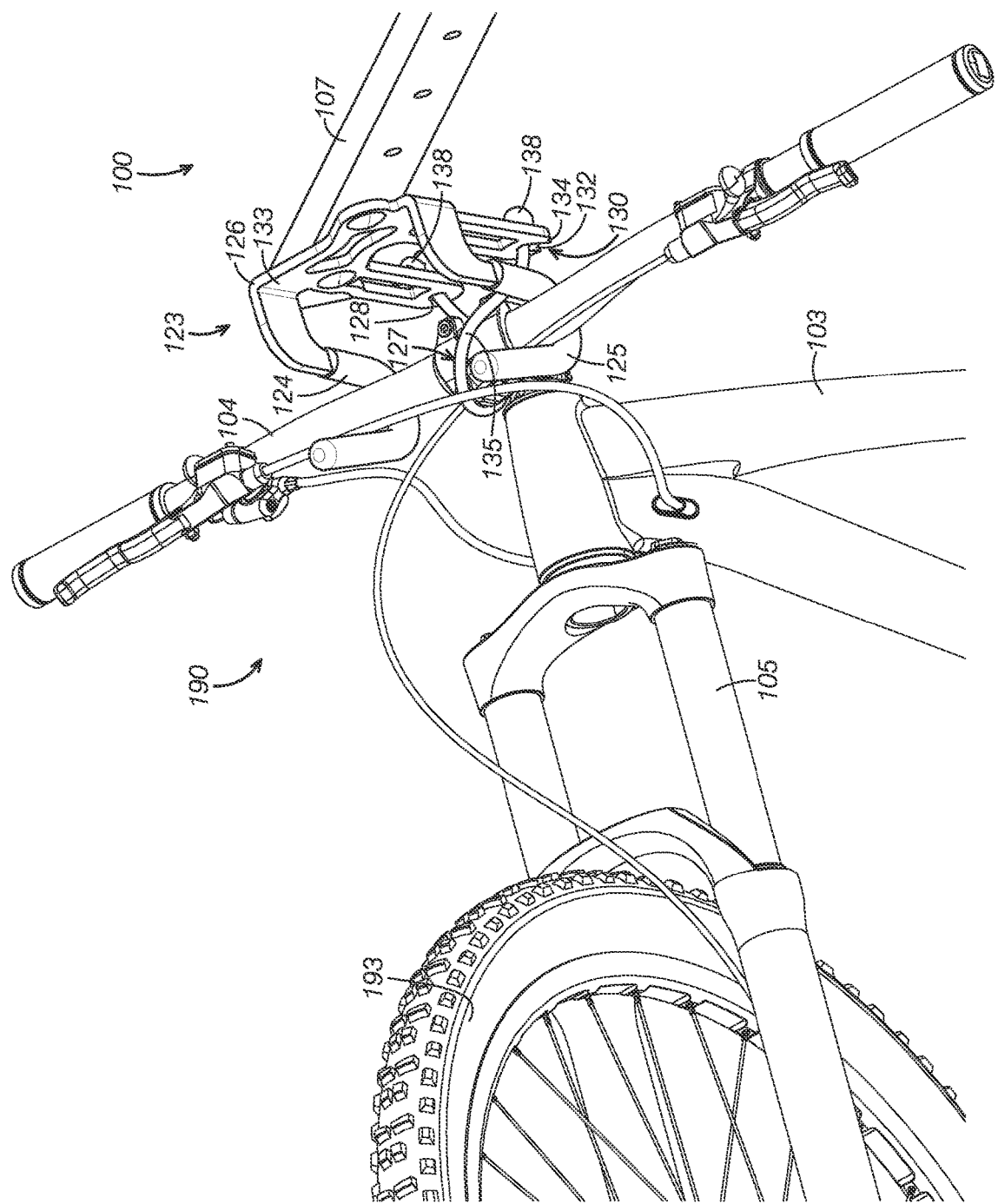
FIG. 7 is a front perspective view of the fixed hook shown in FIG. 1 supporting the first bike with a retention member secured around the handlebar of the first bike.

Fourth hook member 125 is spaced a fixed distance from third hook member 124. As depicted in FIGS. 2, 3 and 7, fourth hook member 125 is disposed below third hook member 124 such that handlebar 104 is tilted relative to the horizontal orientation of rack 107 when supported by fixed hook 123. The tilted orientation allows tighter lateral packing of adjacent bikes.

Body

Body 126 functions to support the other components of fixed hook 123, including third hook member 124, fourth hook member 125, and retention member 127. As shown in FIG. 7, body 126 links third hook member 124 and fourth hook member 125.

Body 126 also serves to define mounting points that cooperate with retention member 127. In particular, FIG. 7 shows that body includes a major face 133 defining a first mounting point 128 and a second mounting point 130.

Mounting Points

The role of the mounting points is to cooperate with retention member 127 to secure a bike to bike rack 100. First mounting point 128 defines a bounded opening.

As depicted in FIGS. 3 and 7, second mounting point 130 defines an open slot. Second mounting point 130 includes a slot window 132 and a slot entrance 134. Slot entrance 134 provides retention member 127 with access to slot window 132.

Retention Member

Figure 8:
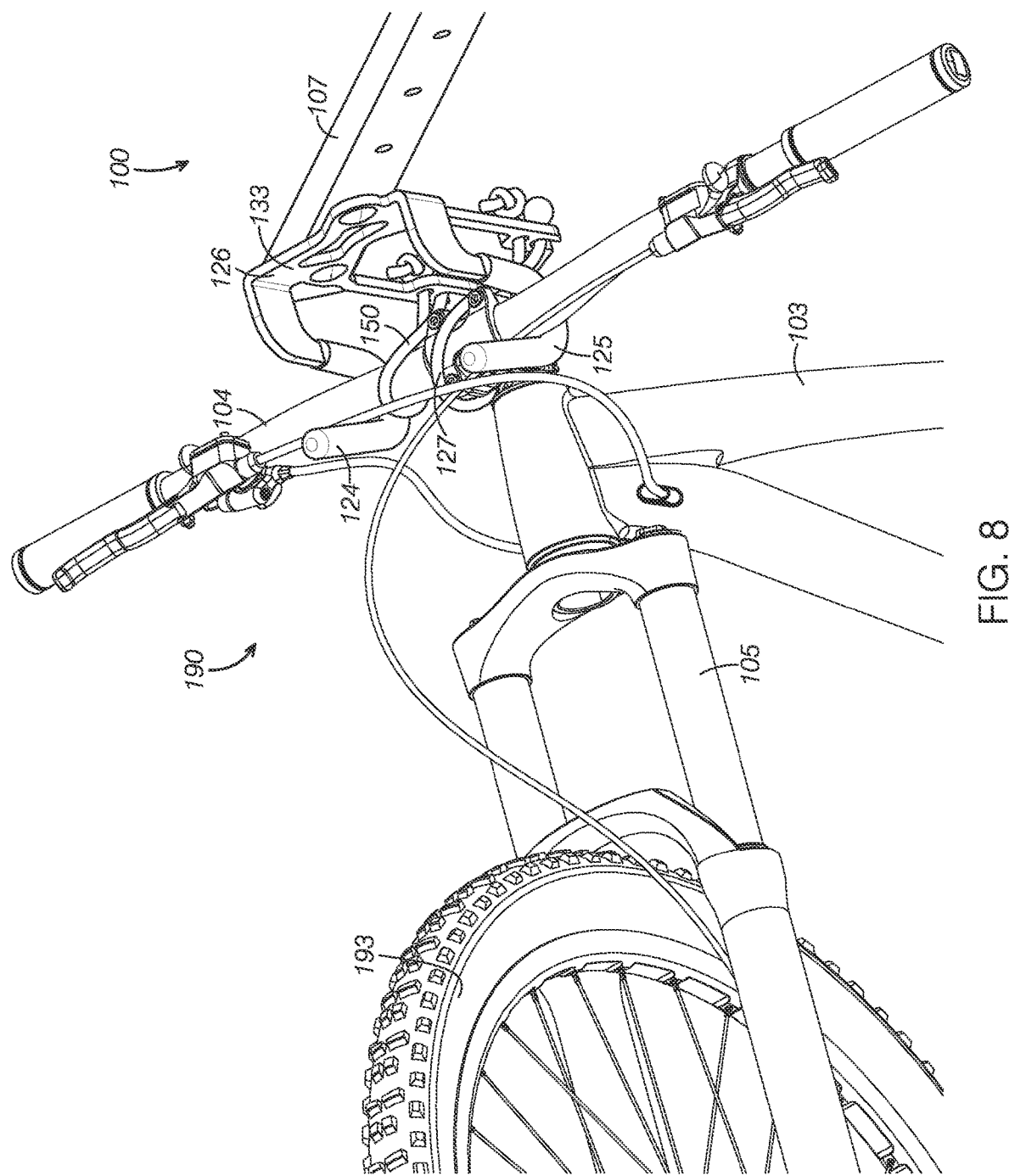
FIG. 8 is a front perspective view of the fixed hook shown in FIG. 1 supporting the first bike with two retention members.

Retention member 127 functions to cooperate with the mounting points to secure a bike to bike rack 100. With reference to FIG. 7, retention member 127 is supported on body 126 and configured to restrict bike 190 from moving away from fixed hook 123. FIG. 8 depicts an example with two retention members, first retention member 127 and a second retention member 150, cooperating to secure the handlebar of a bike.

As shown in FIG. 7, retention member 127 includes an elongate tension bearing member 135, a first boss 138, and a second boss 139. The reader can see in FIG. 7 that retention member 127 is configured to extend over handlebar 104 of bike 190 prior to selectively extending through slot entrance 134 of second mounting point 130 to bind handlebar 104 to fixed hook 123.

The retention member may be any currently known or later developed type of retention member. The reader will appreciate that a variety of retention member types exist and could be used in place of the retention member shown in the figures. In addition to the types of retention members existing currently, it is contemplated that the bike racks described herein could incorporate new types of retention members developed in the future.

The number of retention members in the bike rack may be selected to meet the needs of a given application. The reader should appreciate that the number of retention members may be different in other examples than is shown in the figures. For instance, some bike rack examples include additional or fewer retention members than described in the present example. In FIG. 7 and others, a single retention member is depicted whereas FIG. 8 depicts an example with two retention members.

The shape of the retention member may be adapted to be different than the specific examples shown in the figures to suit a given application.

The size of the retention member may be varied as needed for a given application. In some examples, the retention member is larger relative to the other components than depicted in the figures. In other examples, the retention member is smaller relative to the other components than depicted in the figures. Further, the reader should understand that the retention member and the other components may all be larger or smaller than described herein while maintaining their relative proportions.

In the present example, the retention member is composed of cordage. However, the retention member may be composed of any currently known or later developed material suitable for the applications described herein for which it is used. Suitable materials include metals, polymers, ceramics, wood, and composite materials.

Elongate Tension Bearing Member

As depicted in FIG. 7, elongate tension bearing member 135 has a first end and a second end opposite the first end. With reference to FIG. 7, elongate tension bearing member 135 extends through first mounting point 128. Elongate tension bearing member 135 is restricted from exiting first mounting point 128 because first boss 138 and second boss 139 are larger than first mounting point 128.

As shown in FIG. 7, elongate tension bearing member 135 selectively extends through slot entrance 134 into slot window 132. Elongate tension bearing member 135 is restricted from passing through slot window 132 by second boss 139 being larger than slot window 132.

In some examples, the elongate tension bearing member includes a loop instead of or in addition to a second boss. The body may include a pin or projection complementarily configured with the loop. The loop may extend over the pin or projection to secure the elongate tension bearing member to the body of the fixed hook.

Bosses

The bosses function to restrict elongate tension bearing member 135 from passing through the mounting points. The reader can see in FIG. 7 that first boss 138 is disposed on the first end of elongate tension bearing member 135 and second boss 139 is disposed on the second end of elongate tension bearing member 135. First boss 138 is selected to be larger than first mounting point 128 to restrict elongate tension bearing member 135 from passing through first mounting point 128. Second boss 130 is selected to be larger than slot window 132 of second mounting point 130 to restrict elongate tension bearing member 135 from passing through slot window 132.

The bosses may be any currently known or later developed type of boss. In some examples, such as depicted in FIGS. 7 and 8, a boss is formed by tying the elongate tension bearing member into a knot. The reader will appreciate that a variety of boss types exist and could be used in place of the bosses shown in the figures. In addition to the types of bosses existing currently, it is contemplated that the bike racks described herein could incorporate new types of bosses developed in the future.

The number of bosses in the bike rack may be selected to meet the needs of a given application. The reader should appreciate that the number of bosses may be different in other examples than is shown in the figures. For instance, some bike rack examples include additional or fewer bosses than described in the present example.

The shape of the bosses may be adapted to be different than the specific examples shown in the figures to suit a given application. For example, the bosses may include a face having the shape of a regular or irregular polygon, such as a circle, oval, triangle, square, rectangle pentagon, and the like. Additionally or alternatively, the bosses may include a face having an irregular shape. In three dimensions, the shape of the bosses may be a sphere, a pyramid, a cone, a cube, and variations thereof, such as a hemisphere or a frustoconical shape.

The size of the bosses may be varied as needed for a given application. In some examples, the bosses are larger relative to the other components than depicted in the figures. In other examples, the bosses are smaller relative to the other components than depicted in the figures. Further, the reader should understand that the bosses and the other components may all be larger or smaller than described herein while maintaining their relative proportions.

However, the bosses may be composed of any currently known or later developed material suitable for the applications described herein for which they are used. Suitable materials include metals, polymers, ceramics, wood, and composite materials.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A bike rack configured to mount to a hitch of a vehicle and to support a bike with a handlebar and a fork, the bike rack comprising:
    a frame configured to selectively couple to the hitch of the vehicle;
    a rack supported on the frame in a horizontal orientation and at an elevated position on the frame; and
    an adjustable hook coupled to the rack and configured to support the bike, the adjustable hook including a first hook member and a second hook member spaced from the first hook member;
    wherein the adjustable hook is complementarily configured with the handlebar and the fork to support the bike hanging vertically by the handlebar or the fork from the adjustable hook;
    wherein the second hook member is disposed below the first hook member such that the handlebar is tilted relative to the horizontal orientation of the rack when the handlebar or the fork is supported by the adjustable hook to allow tighter lateral packing of adjacent bikes; and
    wherein the spacing between the first hook member and the second hook member is adjustable
    wherein the first hook member includes:
        a first plate; and
        a first hook extending from the first plate;
    wherein the second hook member includes:
        a second plate abutting the first plate; and
        a second hook extending from the second plate, the second hook spaced from the first hook;
    wherein the first plate is configured to selectively translate relative to the second plate to adjust the spacing between first hook and the second hook;
    wherein the first plate defines a first slot;
    wherein the second plate defines a third slot aligned with the first slot;
    wherein the adjustable hook further comprises a first bolt extending through the third slot and the first slot to couple the first plate to the second plate and to restrict the first plate from translating relative to the second plate;
    wherein the rack defines a first port; and
    wherein the first bolt extends through the first port in addition to extending through the third slot and the first slot to couple the adjustable hook to the rack.

2. The bike rack of claim 1, wherein the first slot and the third slot extend in the direction that the first plate translates relative to the second plate.

3. The bike rack of claim 1, wherein:
the first plate defines a second slot; and
the second plate defines a fourth slot aligned with the third slot.

4. The bike rack of claim 3, wherein the adjustable hook further comprises a second bolt extending through the fourth slot and the second slot to couple the first plate to the second plate and to restrict the first plate from translating relative to the second plate.

5. The bike rack of claim 4, wherein the first slot and the third slot extend in the direction that the first plate translates relative to the second plate.

6. The bike rack of claim 5, wherein:
the rack defines a second port;
the second bolt extends through the second port in addition to extending through the fourth slot and the second slot to couple the adjustable hook to the rack.

7. The bike rack of claim 1, wherein the adjustable hook is configured to support a dual crown fork.

8. A bike rack configured to mount to a hitch of a vehicle and to support a bike with a handlebar and a fork, the bike rack comprising:
a frame configured to selectively couple to the hitch of the vehicle;
a rack supported on the frame in a horizontal orientation and at an elevated position on the frame;
an adjustable hook coupled to the rack and configured to support the bike, the adjustable hook including a first hook member and a second hook member spaced from the first hook member; and
a fixed hook coupled to the rack adjacent to the adjustable hook and configured to support the bike, the fixed hook including a third hook member and a fourth hook member spaced a fixed distance from the third hook member;
wherein the adjustable hook is complementarily configured with the handlebar and the fork to support the bike hanging vertically by the handlebar or the fork from the adjustable hook;
wherein the second hook member is disposed below the first hook member such that the handlebar is tilted relative to the horizontal orientation of the rack when the handlebar or the fork is supported by the adjustable hook to allow tighter lateral packing of adjacent bikes; and
wherein the spacing between the first hook member and the second hook member is adjustable;
wherein the fixed hook further comprises:
a body linking the third hook member and the fourth hook member; and
a retention member supported on the body and configured to restrict the bike from moving away from the fixed hook;
wherein the body defines a first mounting point defining a bounded opening; and
wherein the body defines a second mounting point defining an open slot with a slot window defined in a major face of the body and a slot entrance providing access to the slot window.

9. The bike rack of claim 8, wherein:
the retention member includes:
an elongate tension bearing member with a first end and a second end opposite the first end;
a first boss disposed on the first end; and
a second boss disposed on the second end;
the elongate tension bearing member extends through the first mounting point and is restricted from exiting the first mounting point by the first boss and the second boss being larger than the first mounting point.

10. The bike rack of claim 9, wherein:
the elongate tension bearing member selectively extends through the slot entrance into the slot window and is restricted from passing through the slot window by the second boss being larger than the slot window.

11. The bike rack of claim 10, wherein the retention member is configured to extend over the handlebar of the bike prior to selectively extending through the slot entrance of the second mounting point to bind the handlebar to the fixed hook.

12. The bike rack of claim 8, wherein the fourth hook member is disposed below the third hook member such that the handlebar is tilted relative to the horizontal orientation of the rack when supported by the fixed hook to allow tighter lateral packing of adjacent bikes.

* * * * *